(12) United States Patent
Ji et al.

(10) Patent No.: US 12,222,200 B2
(45) Date of Patent: Feb. 11, 2025

(54) LIGHT-TRANSMITTANCE DEVICE AND USE METHOD

(71) Applicant: Zhongjian Wuzhou Engineering Equipment Co., LTD, Nanjing (CN)

(72) Inventors: Huaijun Ji, Nanjing (CN); Xiaorong Chen, Nanjing (CN); Yongjun Duan, Nanjing (CN); Yigui Wang, Nanjing (CN); Min Zhan, Nanjing (CN); Xin Ding, Nanjing (CN); ShuangShuang Tao, Nanjing (CN); Hong Yang, Nanjing (CN); Jinxin Zhao, Nanjing (CN)

(73) Assignee: Zhongjian Wuzhou Engineering Equipment Co., LTD, Nanjing (CN)

( * ) Notice: Subject to any disclaimer, the term of this patent is extended or adjusted under 35 U.S.C. 154(b) by 0 days.

(21) Appl. No.: 18/632,663

(22) Filed: Apr. 11, 2024

(65) Prior Publication Data

US 2024/0255280 A1 Aug. 1, 2024

(30) Foreign Application Priority Data

May 25, 2023 (CN) .......................... 202310595066.9

(51) Int. Cl.
*B23K 31/00* (2006.01)
*B23K 9/007* (2006.01)
(Continued)

(52) U.S. Cl.
CPC .............. *G01B 11/27* (2013.01); *B23K 9/007* (2013.01); *B23K 31/02* (2013.01); *B23K 31/125* (2013.01);
(Continued)

(58) Field of Classification Search
CPC ........ G01B 11/27; B23K 9/007; B23K 31/02; B23K 37/0531; B23K 31/125; B23K 37/053–0538
(Continued)

(56) References Cited

U.S. PATENT DOCUMENTS

| | | | | |
|---|---|---|---|---|
| 3,920,335 A | * | 11/1975 | Seehase | ................. G01B 11/27 356/138 |
| 2013/0016271 A1 | | 1/2013 | Kwon et al. | |

(Continued)

FOREIGN PATENT DOCUMENTS

| | | | | |
|---|---|---|---|---|
| CN | 108675126 A | * | 10/2018 | ............. B23K 31/02 |
| CN | 111590230 A | * | 8/2020 | ........... B23K 31/125 |

(Continued)

OTHER PUBLICATIONS

CNIPA, Notification of First Office Action for Chinese application CN202310595066.9, Jul. 3, 2023.

(Continued)

*Primary Examiner* — Kiley S Stoner
(74) *Attorney, Agent, or Firm* — Hemisphere Law, PLLC; Zhigang Ma

(57) ABSTRACT

The present disclosure discloses a light-transmittance device and a use method, and belongs to the technical field of manufacturing of rotary equipment. The light-transmittance device includes cylinder sections, a two-column vertical lathe, and a vertical lathe platform; T-shaped supporting fixtures are arranged inside the cylinder sections; light-transmittance tools are arranged at center positions of the cylinder sections; two ends of the cylinder sections are provided with rolling ring base plates which are paired and mounted with the cylinder sections; a roller frame is arranged on a lower side of each group of cylinder section; furthermore, the rolling frames are slidably connected with (Continued)

a rigid rail; a theodolite is arranged on one side close to the cylinder sections; and a triangular bracket and a light-transmittance platform are arranged on a lower side of a shell of the theodolite.

4 Claims, 6 Drawing Sheets

(51) Int. Cl.
    *B23K 31/02*     (2006.01)
    *B23K 31/12*     (2006.01)
    *B23K 37/00*     (2006.01)
    *B23K 37/053*     (2006.01)
    *G01B 11/27*     (2006.01)

(52) U.S. Cl.
    CPC ........ *B23K 37/053* (2013.01); *B23K 37/0531* (2013.01)

(58) Field of Classification Search
    USPC ....................... 228/103–105, 8–9, 44.5, 49.3
    See application file for complete search history.

(56) References Cited

U.S. PATENT DOCUMENTS

2015/0204783 A1    7/2015    Tai et al.
2023/0096399 A1    3/2023    Ha et al.

FOREIGN PATENT DOCUMENTS

| CN | 112880576 A | * | 6/2021 | |
| CN | 114593683 A | * | 6/2022 | ............ G01B 11/06 |
| CN | 116907369 A | * | 10/2023 | |
| EP | 0542251 A2 | * | 5/1993 | |
| EP | 2461132 A1 | * | 6/2012 | ............ G01B 11/27 |

OTHER PUBLICATIONS

CNIPA, Notification to grant patent right for Chinese application CN202310595066.9, Jul. 16, 2023.

* cited by examiner

LIGHT-TRANSMITTANCE DEVICE AND USE METHOD

TECHNICAL FIELD

The present disclosure relates to the technical field of manufacturing of rotating equipment, and in particular, to a light transmittance device and a use method.

BACKGROUND

A combustion tower, also referred to as a combustion furnace, is arranged to safely treat exhaust gases from a technological process and reduce harmful components by burning these exhaust gases, especially for those toxic exhaust gases. The combustion tower can be basically classified into the following three forms: a high-altitude combustion tower, a ground combustion tower, and a ground torch system. It is an environmentally-friendly (which effectively seals the exhaust gases) torch combustion system composed of multiple stages of burners, ensuring full combustion. The combustion tower has the characteristics of zero smoke, zero open flame, zero nitrate vapor, low noise, low radiation, stable combustion, and low combustion cost, and achieves low-NOX emission.

A tower body of the combustion tower is composed of sections of cylinders. During the welding and combination of two ends of the cylinders, since each cylinder is heavy and long, different sections of one cylinder may have a shape difference with an ellipticity of ≤2 mm. Therefore, before welding, it is necessary to check the concentricity to ensure stable abutment between the cylinders and improve the accuracy.

The tower body of the combustion tower belongs to a kind of rotary equipment. At present, in a manufacturing process of the rotary equipment in China, the concentricity is usually detected before the welding of the cylinders by drawing a steel wire in a center. Although drawing a steel wire is simple, a deviation easily occurs in the measurement accuracy, so that the accuracy is hard to ensure. As a result, a product is easily detected to be disqualified and needs to be reprocessed. This affects the working period and increases the cost.

SUMMARY

For the technical problem that the solution in the prior art is too simple, the present disclosure provides a technical solution that is significantly different from the solution in the prior art. Specifically, the present disclosure mainly provides a light-transmittance device and a use method, so as to solve the technical problems in the above background section that the steel wire drawing method used for detecting the concentricity before the welding of the cylinders easily causes a deviation in the measurement accuracy and the measurement accuracy is hard to ensure.

The technical solution used in the present disclosure to solve the above technical problems are as follows:

A light-transmittance device includes cylinder sections, a two-column vertical lathe, and a vertical lathe platform, wherein the vertical lathe platform is located below the two-column vertical lathe; T-shaped locating fixtures are arranged inside the cylinder sections; light-transmittance tools are arranged at center positions of the cylinder sections; each light-transmittance tool includes a light-transmittance base and a light-transmittance plate located on the light-transmittance base; two ends of the cylinder sections are provided with rolling ring base plates which are teamed and mounted with the cylinder sections; a roller frame is arranged on a lower side of each group of cylinder section; the rolling frames are slidably connected with a rigid rail; the rolling ring base plates face the roller frames; a theodolite is arranged on one side close to the cylinder sections; a triangular bracket and a light-transmittance platform are arranged on a lower side of a shell of the theodolite; the triangular bracket is located on an upper surface of the light-transmittance platform;

each light-transmittance base includes a carrying part and an edge folding part which are made of elastic materials; a cross section of a joint between the carrying part and the edge folding part has an angle of 90 degrees; and a specially-shaped annular elastic sheet made of a metal material is arranged at the joint between carrying part and the edge folding part.

Preferably, the cylinder sections have an ellipticity of ≤2 mm.

Preferably, each light-transmittance plate includes a first light-transmittance plate, a second light-transmittance plate, a third light-transmittance plate, and a fourth light-transmittance plate.

the cylinder sections include two thick-wall cylinders and a thin-wall cylinder.

Preferably, there are three groups of roller frames; and the three groups of roller frames are respectively located below the two thick-wall cylinders and the thin-wall cylinder.

A use method of a light-transmittance device. The use method specifically includes the following steps:

S1: supporting the cylinder sections by using the T-shaped supporting fixtures with the ellipticity of ≤2 mm, and machining the rolling ring base plates and light-transmittance bases of the cylinder sections by the two-column vertical lathe, wherein the rolling ring base plates and the light-transmittance tools are machined with the same tool, with a concentricity controlled within 0.1 mm; during turnover machining of the shell, a center is found by taking an excircle of each rolling ring base plate as a reference, and circumferential welds and the light-transmittance plates are then machined;

S2: pairing the cylinder sections, arranging the three groups of roller frames of the same specification on the rigid rail, and leveling the roller frames; and S3: performing light-transmittance pairing using the theodolite and the light-transmittance tools, including the following steps:

① placing equipment on the roller frames, wherein the roller frames have a sturdy foundation to avoid the equipment from shaking during the detection;

② arranging the light-transmittance platform on a right side of the equipment, wherein the platform needs to be fixed and does not shake;

③ mounting the light-transmittance plates on the light-transmittance bases in the center of the equipment;

④ placing the laser theodolite on the light-transmittance platform, and adjusting the triangular bracket to preliminarily align the laser theodolite;

⑤ adjusting the theodolite using a laser beam to allow a light beam of the theodolite to pass through a light hole of a first light-transmittance plate, and checking whether a light spot on a fourth light-transmittance plate is concentric with the first light-transmittance plate;

⑥ adjusting a focal length and the triangular bracket, so that the light beam of the theodolite can be concentric with the light holes of the first light-transmittance plate and the fourth light-transmittance plate, wherein on the premise of not changing a direction of the light beam of the theodolite, the laser beam can pass through the light holes of the first light-transmittance plate and the fourth light-transmittance plate by only adjusting a size of the light spot;

⑦ adjusting a focal length of the laser, so that the light spot is located on a second light-transmittance plate, and observing whether the light spot is located at a center hole position of the second light-transmittance plate;

⑧ if step ⑦ meets a requirement, indicating that the three light holes of the first light-transmittance plate (41), the second light-transmittance plate, and the fourth light-transmittance plate are concentric; if step 7 does not meet the requirement, adjusting welding lines between the thick-wall cylinders on the side with the second light-transmittance plate and the thin-wall cylinder in the middle through the roller frames, so that the light beam can pass through the light holes of the first light-transmittance plate, the second light-transmittance plate, and the fourth light-transmittance plate;

⑨ checking a deviation between a center of the light beam and a center circle of a third light-transmittance plate; if the center and the center circle are basically concentric, adjusting the light beam, and checking whether the light beam is able to pass through a light hole of the third light-transmittance plate; if the light beam is unable to pass through the light hole, adjusting welding lines between the thick-wall cylinders on the side with the third light-transmittance plate and the thin-wall cylinder in the middle through the roller frames until the light beam is able to pass through the light hole of the third light-transmittance plate;

⑩ when only the light beam is adjusted, but the direction of the light beam of the theodolite is unchanged, checking whether the light beam is able to pass through the light holes of the four light-transmittance plates in sequence; if the light beam is able to pass through all the light-transmittance plates, indicating that the light-transmittance detection succeeds; if there is any deviation, continuing to finely adjust the welding lines to ensure that the light beam is able to pass through all the light-transmittance plates;

⑪ during the welding, strengthening light-transmittance monitoring; if any deviation is found, adjusting a welding method and a welding position in a timely manner to meet the accuracy requirement through reversible deformation; and ⑫ after the welding is completed, performing overall concentricity inspection to retest whether the concentricity meets the requirement.

Compared with the prior art, the present disclosure has the beneficial effects below:

(1) Through the arrangement of the light-transmittance bases, the rolling ring base plates, the light-transmittance plates, the roller frames, the rigid rail, the theodolite, the triangular bracket, the light-transmittance platform, and the T-shaped supporting fixtures in the present disclosure, the cylinder sections are supported; before the welding of the cylinder sections, the concentricity is detected; the concentricity is quickly detected by using the laser straight line principle, so that the defects in the traditional technology are overcome; in the manufacturing process, real-time monitoring is achieved, which can effectively control the quality and ensure the accuracy; this is simple and convenient and improves the efficiency of the welding work; if the concentricity is controlled better, the bounce in the running process is smaller, and the light-transmittance device is easier to assemble, so that the concentricity value is quantified and is more intuitive; the quality of the product can be effectively ensured, and the manufacturing cost is reduced; meanwhile, the equipment manufacturing precision is improved, so that the equipment runs more steadily; and the service life of the equipment can be effectively prolonged.

(2) Due to the cooperation between the carrying part and the edge folding part, in the process of finely adjusting the welding lines of the cylinder sections or in the reversible deformation process, since the ellipticity of the cylinder sections is ≤2 mm, different regions of the cylinder sections have a certain deviation (an offset distance is L, 1 mm≤L≥2 mm). Since the requirement for the process accuracy is high, pressing is required during spot welding, so that the elliptical cylinder sections become circular, causing the light-transmittance tools to shift. An angle B between the carrying part and one side of the edge folding part is greater than 90 degrees, and the light hole at a deformation position and the light holes on the light-transmittance plates at other positions are not located on the same straight line, so that the laser beam cannot pass through the light hole of the light-transmittance hole. Since the carrying parts and the edge folding parts are made of the elastic materials, the angle B greater than 90 degrees may be corrected to be 90 degrees. Furthermore, with the help of the specially-shaped annular elastic sheet made of the metal material, the resetting strength is further improved, so that under the action of the light-transmittance base, the light-transmittance plate automatically slightly shifts to be reset, without manual correction. This is very convenient.

The present disclosure will be explained in detail below with reference to the accompanying drawings and specific embodiments.

Figure 1:
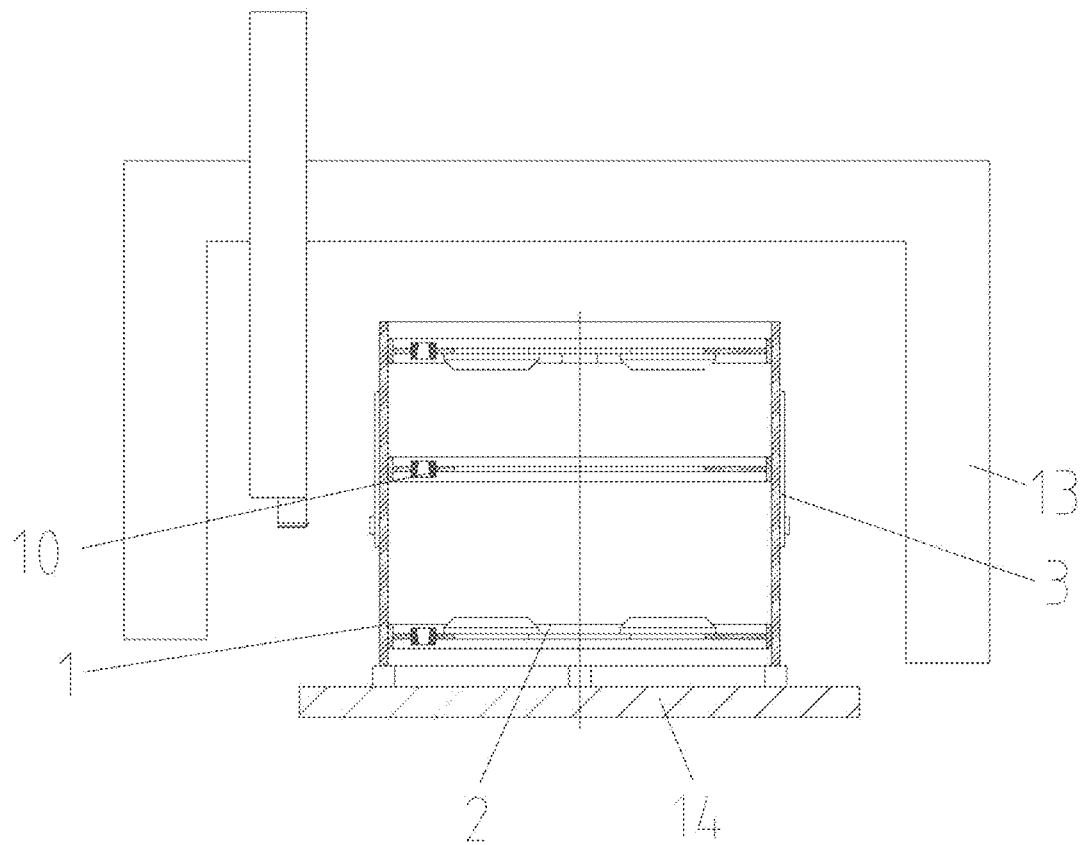
FIG. 1 is a schematic diagram of machining cylinder sections and light-transmittance bases according to the present disclosure.
Figure 2:
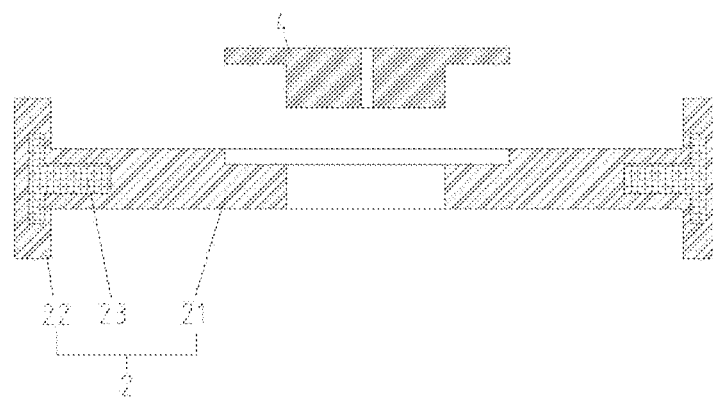
FIG. 2 is a schematic cross-sectional diagram of a light-transmittance base and a light-transmittance plate according to the present disclosure.

Reference numerals in the drawings: 1: cylinder section; 2: light-transmittance base; 21: carrying part; 22: edge folding part; 23: specially-shaped annular elastic sheet; 3: rolling ring base plate; 4: light-transmittance plate; 41: first light-transmittance plate; 42: second light-transmittance plate; 43: third light-transmittance plate; 44: fourth light-transmittance plate; 5: roller frame; 6: rigid rail; 7: theodolite; 8: triangular bracket; 9: light-transmittance platform;

10: T-shaped supporting fixture; 11: thick-wall cylinder; 12: thin-wall cylinder; 13: two-column vertical lathe; and 14: vertical lathe platform.

DETAILED DESCRIPTION OF THE EMBODIMENTS

For the convenience of understanding the present disclosure, a more comprehensive description will be made to the present disclosure below with reference to the relevant accompanying drawings. Several embodiments of the present disclosure are provided in the accompanying drawings. However, the present disclosure can be implemented in different forms, not limited to the embodiments described herein. On the contrary, these embodiments are provided to make the content disclosed in the present disclosure more thorough and comprehensive.

It should be noted that when an element is referred to as being "fixedly arranged to" another element, it can be directly on another element or there may be an intermediate element. When an element is considered to be "connected" to another element, it can be directly connected to another element or there may be an intermediate element. The terms "vertical", "horizontal", "left", "right", and the like used herein are for the purpose of explanation only.

Unless otherwise defined, all technical and scientific terms used herein have the same meanings as those typically understood by those skilled in the art of the present disclosure. The terms used in this specification of the present disclosure is for the purpose of describing the specific embodiments and is not intended to limit the present disclosure. The terms "and/or" used herein include any and all combinations of one or more related listed items.

Embodiment I, referring to FIG. 1 to FIG. 6 emphatically, a light-transmittance device includes cylinder sections 1, a two-column vertical lathe 13, and a vertical lathe platform 14; the vertical lathe platform 14 is located below the two-column vertical lathe 13; T-shaped supporting fixtures 10 are arranged inside the cylinder sections 1; light-transmittance tools are arranged at center positions of the cylinder sections 1; each light-transmittance tool includes a light-transmittance base 2 and a light-transmittance plate 4 located on the light-transmittance base 2; two ends of the cylinder sections 1 are provided with rolling ring base plates 3 which are paired and mounted with the cylinder sections 1; a roller frame 5 is arranged on a lower side of each group of cylinder section 1; the rolling frames 5 are slidably connected with a rigid rail 6; the rolling ring base plates 3 face the roller frames 5; a theodolite 7 is arranged on one side close to the cylinder sections 1; a triangular bracket 8 and a light-transmittance platform 9 are arranged on a lower side of a shell of the theodolite 7; the triangular bracket 8 is located on an upper surface of the light-transmittance platform 9; each light-transmittance base 2 includes a carrying part 21 and an edge folding part 22 which are made of elastic materials; a cross section of a joint between the carrying part 21 and the edge folding part 22 has an angle of 90 degrees; and a specially-shaped annular elastic sheet 23 made of a metal material is arranged at the joint between carrying part 21 and the edge folding part 22.

Through the above structure, quick detection of the concentricity before the welding of the cylinder sections 1 is achieved. This is simple and convenient and improves the efficiency of the welding work. If the concentricity is controlled better, the bounce in the running process is smaller, and the light-transmittance device is easier to assemble, so that the concentricity value is quantified and is more intuitive; the quality of the product can be effectively ensured, and the manufacturing cost is reduced; meanwhile, the equipment manufacturing precision is improved, so that the equipment runs more steadily; and the service life of the equipment can be effectively prolonged.

Specific operations are as follows:

First, the cylinder sections 1 are supported by using the T-shaped supporting fixtures 10 with the ellipticity of ≤2 mm; the rolling ring base plates 3 and light-transmittance bases 2 of the cylinder sections 1 are machined by the two-column vertical lathe 13; the rolling ring base plates 3 and the light-transmittance tools are machined with the same tool, with a concentricity controlled within 0.1 mm; during turnover machining of the shell, a center is found by taking an excircle of each rolling ring base plate 3 as a reference, and circumferential welds and the light-transmittance plates 4 are then machined; the cylinder sections 1 are paired; the three groups of roller frames 5 of the same specification are arranged on the rigid rail 6 and are leveled; light-transmittance pairing is performed using the theodolite 7 and the light-transmittance tools.

Equipment is placed on the roller frames 5, wherein the roller frames 5 have a sturdy foundation to avoid the equipment from shaking during the detection; the light-transmittance platform 9 is arranged on a right side of the equipment, wherein the platform needs to be fixed and does not shake; the light-transmittance plates 4 are mounted on the light-transmittance bases 2 in the center of the equipment; the laser theodolite 7 is placed on a detection platform, and the triangular bracket 8 to preliminarily align the laser theodolite 7; the theodolite 7 is adjusted using a laser beam to allow a light beam of the theodolite 7 to pass through a light hole of the first light-transmittance plate 41, and whether a light spot on the fourth light-transmittance plate 44 is concentric with the first light-transmittance plate 41; a focal length and the triangular bracket 8 are adjusted, so that the light beam of the theodolite 7 is concentric with the light holes of the first light-transmittance plate 41 and the fourth light-transmittance plate 44, wherein on the premise of not changing a direction of the light beam of the theodolite 7, the laser beam is able to pass through the light holes of the first light-transmittance plate 41 and the fourth light-transmittance plate 44 by only adjusting a size of the light spot; a focal length of the laser is adjusted, so that the light spot is located on the second light-transmittance plate 42, and whether the light spot is located at a center hole position of the second light-transmittance plate 42 is checked; if the above requirement is met, it indicates that the three light holes of the first light-transmittance plate 41, the second light-transmittance plate 42, and the fourth light-transmittance plate 44 are concentric; if the above requirement is not met, welding lines between the thick-wall cylinders 11 on the side with the second light-transmittance plate 42 and the thin-wall cylinder 12 in the middle are adjusted through the roller frames 5, so that the light beam is able to pass through the light holes of the first light-transmittance plate 41, the second light-transmittance plate 42, and the fourth light-transmittance plate 44; a deviation between a center of the light beam and a center circle of the third light-transmittance plate 43 is checked; if the center and the center circle are basically concentric, the light beam is adjusted, and whether the light beam is able to pass through a light hole of the third light-transmittance plate 43 is checked; if the light beam is unable to pass through the light hole, welding lines between the thick-wall cylinders 11 on the side with the third light-transmittance plate 43 and the thin-wall cylinder 12 in the middle are adjusted through the roller frames 5 until the light beam is able to pass through the light hole of the third light-transmittance plate 43; when only the light beam is adjusted, but the direction of the light beam of the theodolite 7 is unchanged, whether the light beam is able to pass through the light holes of the four light-transmittance plates 4 in sequence is checked; if the light beam is able to pass through all the light-transmittance plates, it indicates that the light-transmittance detection succeeds; if there is any deviation, the welding lines are continued to be finely adjusted to ensure that the light beam is able to pass through all the light-transmittance plates; during the welding, light-transmittance monitoring is strengthened; if any deviation is found, a welding method and a welding position are adjusted in a timely manner to meet the accuracy requirement through reversible deformation; and after the welding is completed, overall concentricity inspection is performed to retest whether the concentricity meets the requirement.

Figure 3:
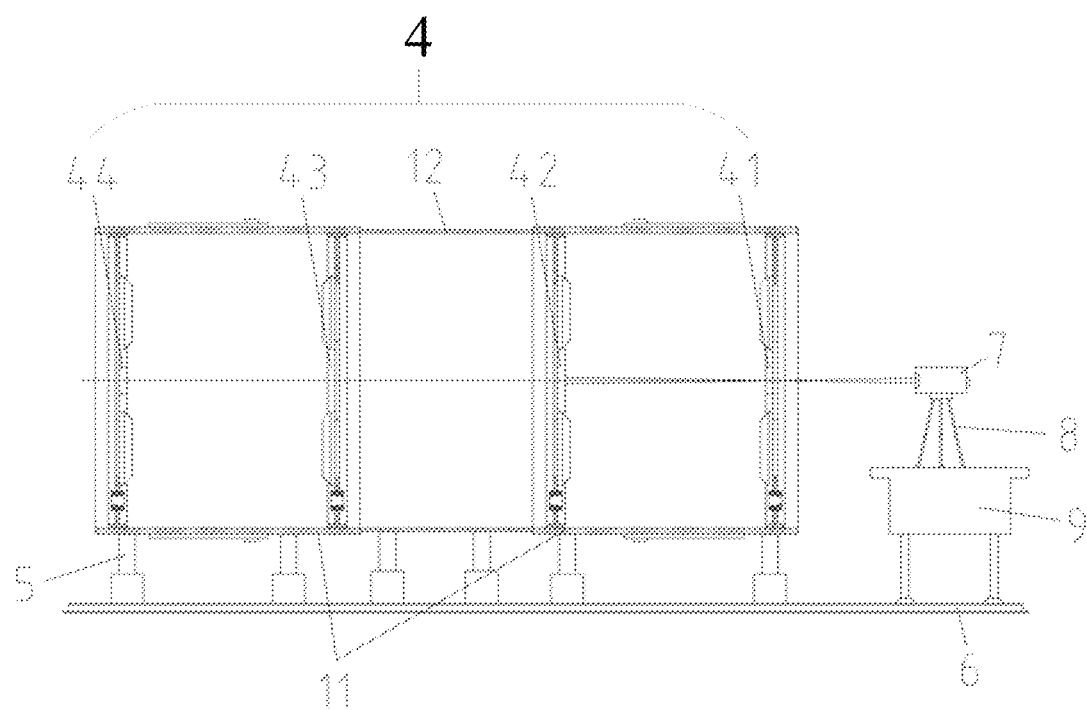
FIG. 3 is a schematic diagram showing that a laser beam passes through light holes of a first light-transmittance plate and a second light-transmittance plate according to the present disclosure.
Figure 4:
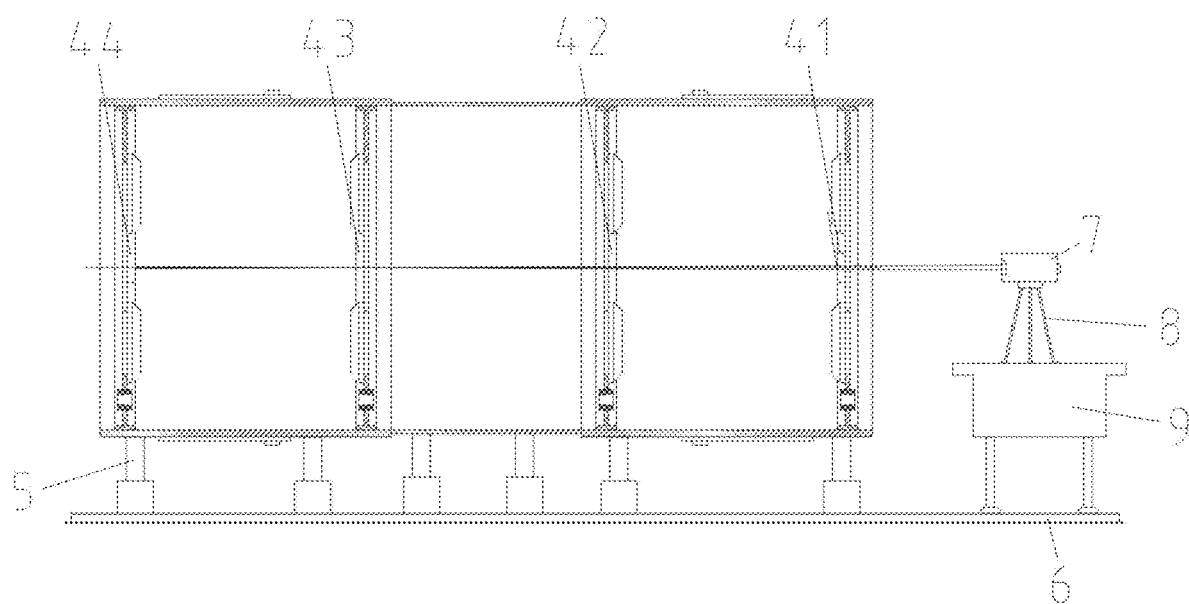
FIG. 4 is a schematic diagram showing that a laser beam passes through light holes of a third light-transmittance plate and a fourth light-transmittance plate according to the present disclosure.
Figure 5:
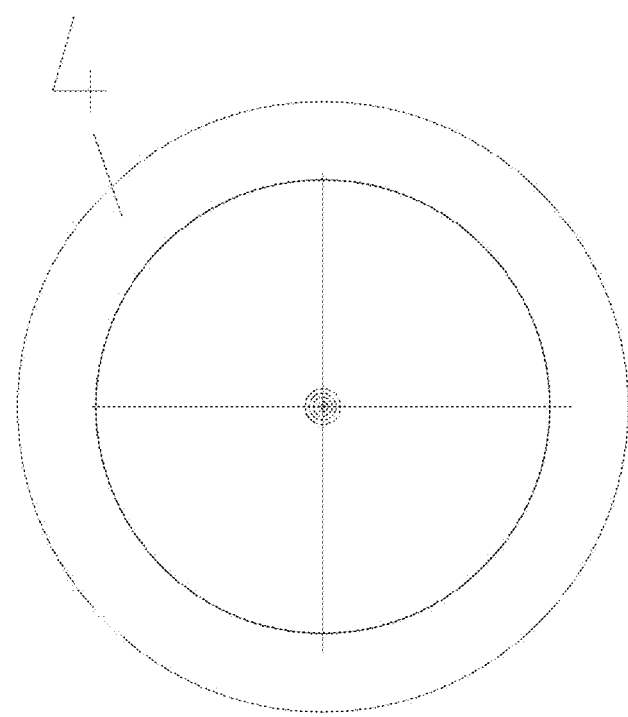
FIG. 5 is a schematic diagram of a light-transmittance plate according to the present disclosure.
Figure 6:
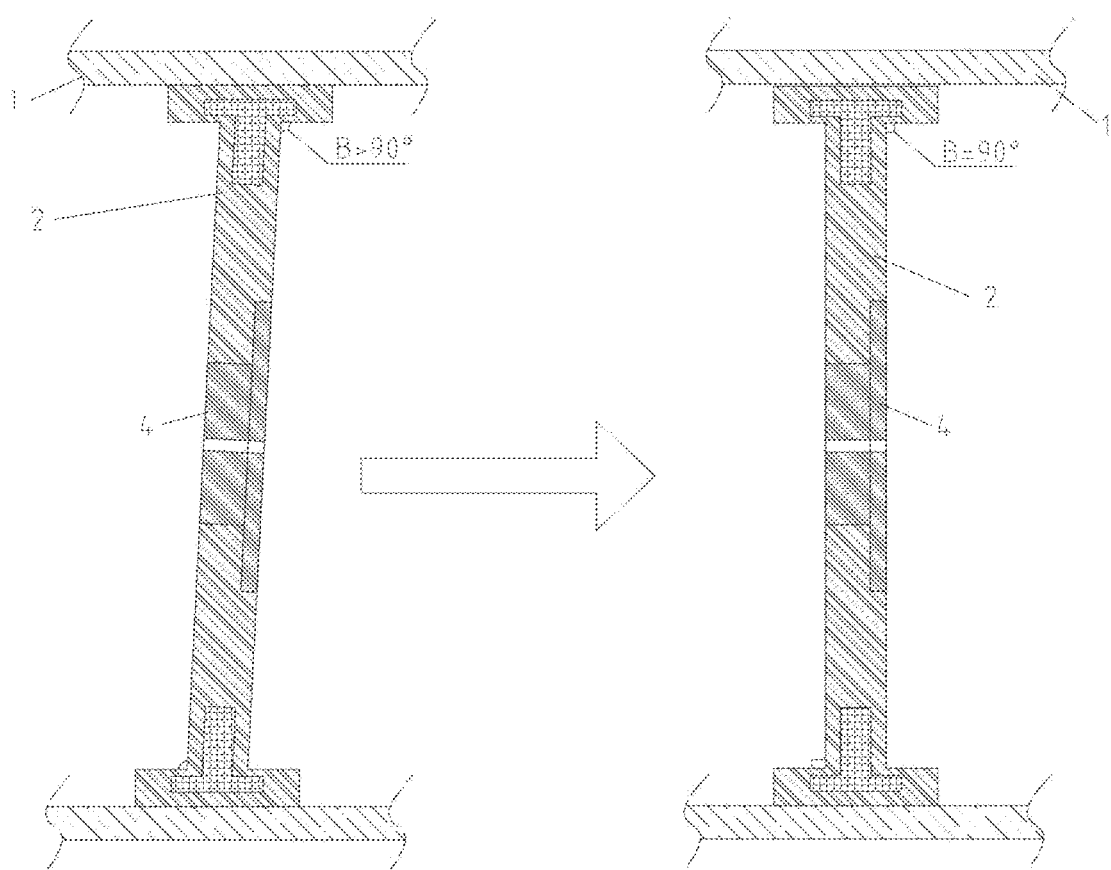
FIG. 6 is a schematic diagram showing that an angle B shifts to be reset during fine adjustment of welding lines of cylinder sections or reversible deformation by a light-transmittance tool according to the present disclosure.

Embodiment II, referring to FIG. 3 to FIG. 4 emphatically, the ellipticity of the cylinder sections 1 is ≤2 mm, so that not all the cylinder sections 1 have circular cross sections. Some of the cylinder sections have approximately elliptical cross sections. When welding is required, the cylinder sections are pressed. The light-transmittance plates 4 include a first light-transmittance plate 41, a second light-transmittance plate 42, a third light-transmittance plate 43, and a fourth light-transmittance plate 44. The cylinder sections 1 include two thick-wall cylinders 11 and one thin-wall cylinder 12. There are three groups of roller frames 5. The three groups of roller frames 5 are respectively located below the two thick-wall cylinders 11 and the thin-wall cylinder 12. Through the three groups of roller frames 5, abutment between front and rear ends of different cylinder sections 1 is achieved.

The above provides an exemplary description of the present disclosure in combination with the accompanying drawings. It is evident that the specific implementations of the present disclosure are not limited by the aforementioned methods. Any non-substantial improvement made by adopting the concept and technical solutions of the method of the present disclosure, or direct application of the concept and technical solutions of the present disclosure to other occasions without improvement, all fall within the scope of protection of the present disclosure.

What is claimed is:

1. A light-transmittance device, comprising cylinder sections (1), a two-column vertical lathe (13), and a vertical lathe platform (14), wherein the vertical lathe platform (14) is located below the two-column vertical lathe (13); T-shaped supporting fixtures (10) are arranged inside the cylinder sections (1); light-transmittance tools are arranged at center positions of the cylinder sections (1); each light-transmittance tool comprises a group of light-transmittance bases (2) and a group of light-transmittance plates (4) located on the group of light-transmittance bases (2) respectively; two ends of the cylinder sections (1) are provided with rolling ring base plates (3) which are paired and mounted with the cylinder sections (1); a roller frame (5) is arranged on a lower side of each group of cylinder section (1); the rolling frames (5) are slidably connected with a rigid rail (6); the rolling ring base plates (3) face the roller frames (5); a theodolite (7) is arranged on one side of the cylinder sections (1); a triangular bracket (8) and a light-transmittance platform (9) are arranged on a lower side of a shell of the theodolite (7); the triangular bracket (8) is located on an upper surface of the light-transmittance platform (9);

each light-transmittance base (2) comprises a carrying part (21) and an edge folding part (22) which are made of elastic materials; a cross section of a joint between the carrying part (21) and the edge folding part (22) has an angle of 90 degrees; a specially-shaped annular elastic sheet (23) made of a metal material is arranged at the joint between carrying part (21) and the edge folding part (22);

the group of light-transmittance plates (4) comprise a first light-transmittance plate (41), a second light-transmittance plate (42), a third light-transmittance plate (43), and a fourth light-transmittance plate (44); and the cylinder sections (1) comprise two first cylinders (11) with a first wall thickness and a second cylinder (12) with a second wall thickness greater than the first wall thickness.

2. The light-transmittance device according to claim 1, wherein the cylinder sections (1) have an ellipticity of ≤2 mm.

3. The light-transmittance device according to claim 1, wherein there are three groups of roller frames (5); and the three groups of roller frames (5) are respectively located below the two first cylinders (11) and the second cylinder (12).

4. A use method of a light-transmittance device, which uses the light-transmittance device according to any one of claims 1 to 3, wherein a use method specifically comprises the following steps:

S1: supporting the cylinder sections (1) by using the T-shaped supporting fixtures (10) with the ellipticity of ≤2 mm, and machining the rolling ring base plates (3) and light-transmittance bases (2) of the cylinder sections (1) by the two-column vertical lathe (13), wherein the rolling ring base plates (3) and the light-transmittance tools are machined with the same tool, with a concentricity controlled within 0.1 mm; during turnover machining of the shell, a center is found by taking an excircle of each rolling ring base plate (3) as a reference, and circumferential welds and the light-transmittance plates (4) are then machined;

S2: pairing the cylinder sections (1), arranging the three groups of roller frames (5) of a same specification on the rigid rail (6), and leveling the roller frames (5); and S3: performing light-transmittance pairing using the theodolite (7) and the light-transmittance tools, comprising the following steps:

① placing equipment on the roller frames (5), wherein the roller frames (5) have a sturdy foundation to avoid the equipment from shaking during the detection;

② arranging the light-transmittance platform (9) on a right side of the equipment, wherein the platform needs to be fixed and does not shake;

③ mounting the light-transmittance plates (4) on the light-transmittance bases (2) in the center of the equipment;

④ placing the laser theodolite (7) on the light-transmittance platform (9), and adjusting the triangular bracket (8) to preliminarily align the laser theodolite (7);

⑤ adjusting the theodolite (7) using a laser beam to allow a light beam of the theodolite (7) to pass through a light hole of the first light-transmittance plate (41), and checking whether a light spot on the fourth light-transmittance plate (44) is concentric with the first light-transmittance plate (41);

⑥ adjusting a focal length and the triangular bracket (8), so that the light beam of the theodolite (7) is concentric with the light holes of the first light-transmittance plate (41) and the fourth light-transmittance plate (44), wherein on the premise of not changing a direction of the light beam of the theodolite (7), the laser beam is able to pass through the light holes of the first light-transmittance plate (41) and the fourth light-transmittance plate (44) by only adjusting a size of the light spot;

⑦ adjusting a focal length of the laser, so that the light spot is located on the second light-transmittance plate (42), and observing whether the light spot is located at a center hole position of the second light-transmittance plate (42);

⑧ if step ⑦ meets a requirement, indicating that the three light holes of the first light-transmittance plate (41), the second light-transmittance plate (42), and the fourth light-transmittance plate (44) are concentric; if step (7) does not meet the requirement, adjusting welding lines between the first cylinders (11) on the side with the second light-transmittance plate (42) and the second cylinder (12) in a middle through the roller frames (5), so that the light beam is able to pass through the light holes of the first light-transmittance plate (41), the second light-transmittance plate (42), and the fourth light-transmittance plate (44);

⑨ checking a deviation between a center of the light beam and a center circle of the third light-transmittance plate (43); if the center and the center circle are basically concentric, adjusting the light beam, and checking whether the light beam is able to pass through a light hole of the third light-transmittance plate (43); if the light beam is unable to pass through the light hole, adjusting welding lines between the first cylinders (11) on the side with the third light-transmittance plate (43) and the second cylinder (12) in a middle through the roller frames (5) until the light beam is able to pass through the light hole of the third light-transmittance plate (43);

⑩ when only the light beam is adjusted, but the direction of the light beam of the theodolite (7) is unchanged, checking whether the light beam is able to pass through the light holes of the four light-transmittance plates (4) in sequence; if the light beam is able to pass through all the light-transmittance plates, indicating that the light-transmittance detection succeeds; if there is any deviation, continuing to finely adjust the welding lines to ensure that the light beam is able to pass through all the light-transmittance plates;

⑪ during the welding, strengthening light-transmittance monitoring; if any deviation is found, adjusting a welding method and a welding position in a timely manner to meet the requirement through reversible deformation; and ⑫ after the welding is completed, performing overall concentricity inspection to retest whether the concentricity meets the requirement.

* * * * *